(12) United States Patent
Kimura

(10) Patent No.: US 11,068,673 B2
(45) Date of Patent: Jul. 20, 2021

(54) HANDHELD BASKET AND COMMODITY CONTAINER THAT HAVE ANTENNAS FOR READING TAG INFORMATION OF COMMODITIES

(71) Applicant: TOSHIBA TEC KABUSHIKI KAISHA, Tokyo (JP)

(72) Inventor: Masaki Kimura, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/655,848

(22) Filed: Oct. 17, 2019

(65) Prior Publication Data

US 2020/0193102 A1    Jun. 18, 2020

(30) Foreign Application Priority Data

Dec. 14, 2018  (JP) .............................. JP2018-234056

(51) Int. Cl.
*G06K 7/10* (2006.01)
*G06Q 20/20* (2012.01)
(Continued)

(52) U.S. Cl.
CPC .......... *G06K 7/10336* (2013.01); *B65D 1/38* (2013.01); *G06Q 20/208* (2013.01); *G07G 1/145* (2013.01); *G07G 3/00* (2013.01); *G08B 13/246* (2013.01)

(58) Field of Classification Search
CPC .... G07G 1/0009; G07G 1/0045; G07G 1/009; G07G 3/00; G06K 7/10336;
(Continued)

(56) References Cited

U.S. PATENT DOCUMENTS

2002/0113123 A1\* 8/2002 Otto ..................... G06Q 30/06
235/381
2006/0261161 A1  11/2006 Murofushi et al.
(Continued)

FOREIGN PATENT DOCUMENTS

CN  102800164 A    11/2012
EP     1583050 A1 \* 10/2005  ........... G06Q 20/352
(Continued)

OTHER PUBLICATIONS

Extended European Search Report dated Feb. 25, 2020, filed in counterpart European Patent Application No. 19191431.6, 8 pages.

*Primary Examiner* — Suezu Ellis

(74) *Attorney, Agent, or Firm* — Kim & Stewart LLP

(57) ABSTRACT

A commodity container includes a main body having a container space, first and second antennas, and a processing circuit. The first antenna is configured to receive tag information from one or more wireless tags in a first range covering at a first region of the container space. The second antenna is configured to receive tag information from one or more wireless tags in a second range covering at a second region the container space. The second range is different from the first range. The processing circuit is configured to store tag information received by the first antenna in a data storage unit, determine whether or not tag information received by the second antenna corresponds to the stored tag information, and generate a control signal for generation of a user notification when the tag information received by the second antenna does not correspond to the stored tag information.

20 Claims, 6 Drawing Sheets

(51) Int. Cl.
　　　*G07G 1/14*　　　(2006.01)
　　　*G07G 3/00*　　　(2006.01)
　　　*G08B 13/24*　　　(2006.01)
　　　*B65D 1/38*　　　(2006.01)

(58) Field of Classification Search
　　　CPC ........... G06K 7/10356; G06K 7/10366; G06K 17/0029; G08B 13/246; B62B 5/0096
　　　USPC ....................................................... 235/383
　　　See application file for complete search history.

(56) References Cited

U.S. PATENT DOCUMENTS

| | | | |
|---|---|---|---|
| 2015/0302708 | A1 | 10/2015 | Hattori |
| 2016/0180670 | A1* | 6/2016 | Swope ............... G08B 13/2417 340/568.5 |
| 2017/0372562 | A1* | 12/2017 | Terahara ................ G06Q 20/18 |
| 2019/0138772 | A1 | 5/2019 | Sakurai |

FOREIGN PATENT DOCUMENTS

| | | |
|---|---|---|
| EP | 3454309 A1 | 3/2019 |
| EP | 3483776 A1 | 5/2019 |
| JP | 2005-148924 A | 6/2005 |
| WO | 2010079536 A1 | 7/2010 |

\* cited by examiner

US 11,068,673 B2

HANDHELD BASKET AND COMMODITY CONTAINER THAT HAVE ANTENNAS FOR READING TAG INFORMATION OF COMMODITIES

CROSS-REFERENCE TO RELATED APPLICATION

This application is based upon and claims the benefit of priority from Japanese Patent Application No. 2018-234056, filed on Dec. 14, 2018, the entire contents of which are incorporated herein by reference.

FIELD

Embodiments described herein relate generally to a commodity container.

BACKGROUND

There is a commodity container such as a basket and a shopping cart for accommodating commodities to be purchased in a store such as a supermarket or a convenience store. A commodity container of one type includes an antenna to receive commodity identification information for identifying a commodity from a wireless tag attached to a commodity in the commodity container. When a customer takes a commodity that the customer wants to purchase in the store and puts the commodity in the commodity container, the commodity container reads commodity identification information from a wireless tag attached to the commodity.

In some cases, if there are many customers using a commodity accommodation apparatus in the store, the antenna of one of the commodity container may erroneously receive tag information from a wireless tag attached to commodity accommodated in another one of the commodity containers. In order to prevent such misreading, a communication range of the antenna may be set to be very narrow. However, when the communication range of the antenna is narrow, the antenna may not be reliably receive tag information from wireless tags.

DETAILED DESCRIPTION

Figure 1:
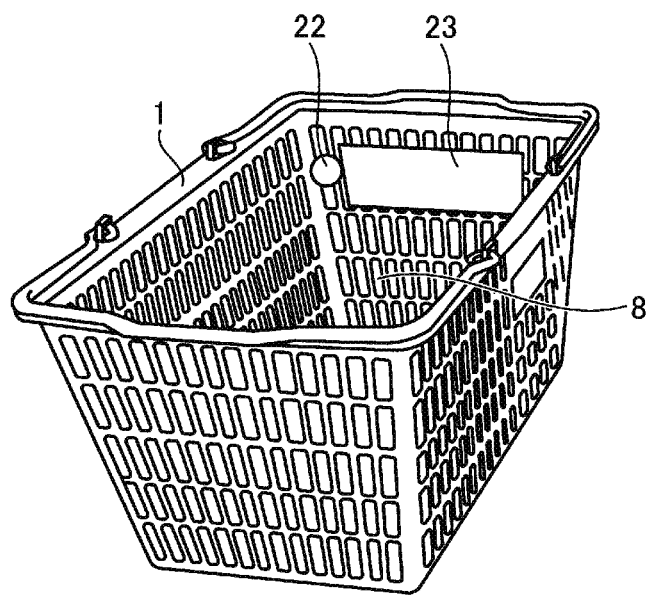
FIG. 1 illustrates a perspective view of a commodity container according to an embodiment.

Embodiments provide a commodity container capable of reliably reading tag information related to a commodity accommodated in a container space.

In general, according to an embodiment, a commodity container includes a main body having a container space, first and second antennas, and a processing circuit. The first antenna is configured to receive tag information from wireless tags in a first range covering a first region of the container space. The second antenna is configured to receive tag information from wireless tags in a second range covering a second region of the container space. The second range is different from the first range. The processing circuit is configured to store tag information received by the first antenna in a data storage unit, determine whether tag information received by the second antenna corresponds to the stored tag information, and generate a control signal for generation of a user notification when the tag information received by the second antenna does not correspond to the stored tag information.

Hereinafter, a commodity container according to an example embodiment will be described with reference to drawings. In the example, a shopping basket for accommodating a commodity is described as an example of a commodity container. The present disclosure is not limited to the particular example embodiment(s) described below.

First, a store system will be described. In a store, a large number of commodities (items for sale) are displayed on commodity shelves and the like. A shopping customer obtains a commodity container at the store entrance. Then, the customer moves about in the store, selects a commodity to purchase from a commodity shelf/display and places the commodity in a container space of the commodity container.

A wireless tag is attached to the commodities displayed for sale in the store. The wireless tag includes an antenna and a storage unit, and generates electric power when the antenna receives radio waves transmitted from a registration antenna 23 or a warning antenna 24 (described below) and then transmits information using the generated power (in the embodiment, the transmitted information is tag information including commodity identification information for identifying a commodity) that has been previously stored in the storage unit to the registration antenna 23 or the warning antenna 24. The wireless tag can have an adhesive surface and be attached to the commodity with adhesive strength. The wireless tag may also be attached to the commodity by a band or otherwise. The commodity identification information is information for uniquely specifying a commodity as an individual item. For example, when two commodities of the same type are purchased (for example, when two packs of milk of the same type are purchased), commodity identification information of each individual item is different and thus, can uniquely identify each individual item. The commodity identification information includes information (e.g., commodity code) for identifying the type of commodity. In a commodity master 342 (see FIG. 4) described below, the commodity name and the price of the commodity are read out based on the information for identifying the type of commodity.

FIG. 1 illustrates a perspective view showing appearance of a commodity container 1 according to the embodiment. As shown in FIG. 1, the commodity container 1 is, for example, a basket (e.g., handheld basket). The commodity container 1 includes a container space 8 that accommodates a commodity inside a main body thereof. The commodity container 1 includes the registration antenna 23 and the warning antenna 24 (see FIG. 2) on the inner surface. The registration antenna 23 and the warning antenna 24 receive commodity identification information from a wireless tag attached to the commodity accommodated in the container space 8. The tag information including the commodity identification information received by the registration antenna 23 is stored in a tag information storage unit 131 (see FIG. 3). The details of the registration antenna 23 and the warning antenna 24 will be described with reference to FIGS. 2 and 3.

The customer, who accommodates all the commodities to purchase in the commodity container 1, moves to a settlement unit provided in the store. One or a plurality of POS terminals 9 (also referred to as sales data processing devices) are installed in the settlement unit. The POS terminal executes sales registration processing and settlement processing of a commodity to be sold. The sales registration processing is to read out the commodity information (e.g., commodity name, price, and the like) of the commodity from the commodity master 342 (see FIG. 4) based on the commodity identification information received from the commodity container 1 to display the commodity information of the read commodity and store the commodity information in a commodity information unit 331 (see FIG. 4). The settlement processing is the processing which calculates and displays the total cost and tax amount related to a transaction based on the commodity information stored in the commodity information unit 331 along with the sales registration processing, calculates and displays the change based on the money received from the customer, and then, issues a receipt on which commodity information and settlement information (e.g., total cost, received money, amount of change, and the like) are printed. Information combining commodity product information and settlement information is called sales information.

Figure 2:
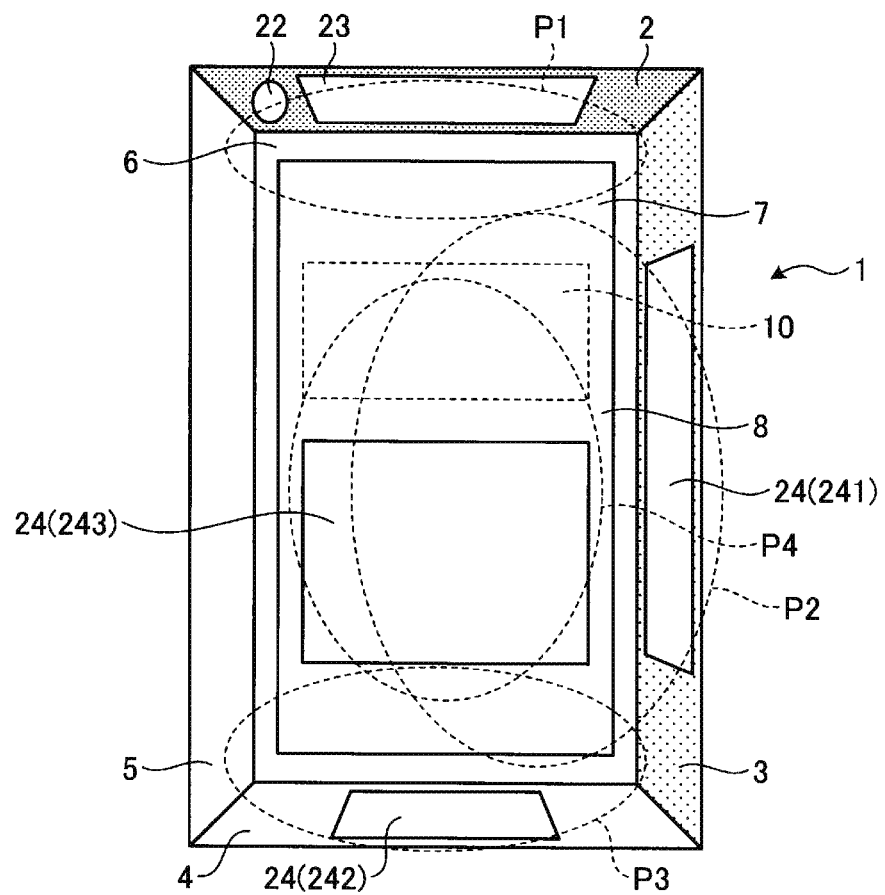
FIG. 2 is a schematic top plan view of the commodity container.

Subsequently, the structure of the commodity container 1 will be described. FIG. 2 illustrates a schematic top plan view of the commodity container 1. The commodity container 1 includes a side surface portion 2, a side surface portion 3, a side surface portion 4, and a side surface portion 5, each having a planar shape, on the four side surfaces, and a planar bottom surface portion 6 connected to each side surface and is open at the top. A space surrounded by the side surface portion 2, the side surface portion 3, the side surface portion 4, the side surface portion 5, and the bottom surface portion 6 is a container space (accommodation portion).

The side surface portion 2 includes the registration antenna 23 that receives tag information including commodity identification information transmitted from a wireless tag. The side surface portion 3 includes the warning antenna 24 (241) that receives tag information including commodity identification information transmitted from the wireless tag. The side surface portion 4 includes the warning antenna 24 (242) that receives tag information including commodity identification information transmitted from the wireless tag. The bottom surface portion 6 includes the warning antenna 24 (243) that receives tag information including commodity identification information transmitted from the wireless tag. In the following description, the warning antenna 241, the warning antenna 242, and the warning antenna 243 are collectively referred to as the warning antenna 24.

In addition, the bottom surface portion 6 includes a wireless tag reader 10 that is electrically connected to the registration antenna 23 and the warning antenna 24 and reads tag information when the registration antenna 23 and the warning antenna 24 receive the tag information from the wireless tag. The wireless tag reader 10 can distinguish between the commodity identification information received by the registration antenna 23 and the commodity identification information received by the warning antenna 24. At the top portion of the wireless tag reader 10, a flat plate 7 is provided which substantially covers the bottom portion 6 that separates the container space 8. The commodities accommodated in the container space 8 are placed on the flat plate 7. The wireless tag reader 10 will be described below with reference to FIG. 3.

The registration antenna 23 provided on the side surface portion 2 transmits a weak radio wave toward the container space 8. The radio wave transmitted from the registration antenna 23 reaches the wireless tag located in the vicinity of the registration antenna 23 and in an area P1 of the container space 8. The area P1 is from the registration antenna 23 to a close distance (about several tens of centimeters) inside the container space 8. The customer should bring the commodity very close to the registration antenna 23. The wireless tag located in the area P1 responds to the radio wave transmitted from the registration antenna 23 and transmits tag information including the commodity identification information stored in the wireless tag. The registration antenna 23 receives the tag information transmitted by the wireless tag. The wireless tag reader 10 reads tag information received by the registration antenna 23. The radio waves transmitted by the warning antenna 241, the warning antenna 242 and the warning antenna 243 do not reach the wireless tag located in the area P1, and thus, the wireless tag located in the area P1 cannot receive the radio wave transmitted by the warning antenna 24. Therefore, the wireless tag located in the area P1 does not respond to the radio wave transmitted by the warning antenna 24.

The warning antenna 241 provided on the side surface portion 3 transmits a weak radio wave toward the container space 8. The warning antenna 241 transmits a weak radio wave having strength of about 2 to 3 times that of the registration antenna 23. The radio wave transmitted from the warning antenna 241 reaches the wireless tag located in an area P2 of the container space 8. The area P2 is from the warning antenna 241 to a close distance (about several tens of centimeters) in the container space 8. Any wireless tag located in the area P2 responds to the radio wave transmitted from the warning antenna 241 and transmits tag information including the commodity identification information stored in the wireless tag. The warning antenna 241 receives tag information transmitted by the wireless tag. The wireless tag reader 10 reads tag information received by the warning antenna 241. The radio wave transmitted by the registration antenna 23 does not reach (in sufficient strength) the wireless tags located in the area P2, and thus, wireless tags located in the area P2 cannot receive (in sufficient strength) the radio wave transmitted by the registration antenna 23. Therefore, the wireless tags located in the area P2 do not respond to the radio wave transmitted by the registration antenna 23.

The warning antenna 242 provided on the side surface portion 4 transmits a weak radio wave toward the container space 8. The warning antenna 242 transmits a weak radio wave having strength of about 2 to 3 times that of the registration antenna 23. The radio wave transmitted from the warning antenna 242 reaches the wireless tags located in an area P3 of the container space 8. The area P3 is from the warning antenna 242 to a close distance (about several tens of centimeters) in the container space 8. Then, the wireless tags located in the area P3 respond to the radio wave transmitted from the warning antenna 242 and transmits tag information including the commodity identification information stored in the wireless tag. The warning antenna 242 receives tag information transmitted by these wireless tags. The wireless tag reader 10 reads tag information received by the warning antenna 242. The radio wave transmitted by the registration antenna 23 does not reach the wireless tags located in the area P3, and thus, the wireless tags located in the area P3 do not receive the radio wave transmitted by the registration antenna 23. Therefore, the wireless tags located in the area P3 do not respond to the radio wave transmitted by the registration antenna 23.

The warning antenna 243 provided on the bottom surface portion 6 transmits a weak radio wave toward the container space 8. The warning antenna 243 transmits a weak radio wave having strength of about 2 to 3 times that of the registration antenna 23. The radio wave transmitted from the warning antenna 243 reaches the wireless tags located in an area P4 of the container space 8. The area P4 is from the warning antenna 243 to a close distance (about several tens of centimeters) in an upper direction. Then, the wireless tags located in the area P4 respond to the radio wave transmitted from the warning antenna 243 and transmits information including the commodity identification information stored in the wireless tag. The warning antenna 243 receives tag information transmitted by these wireless tags. The wireless tag reader 10 reads tag information received by the warning antenna 243. The radio wave transmitted by the registration antenna 23 does not reach the wireless tags located in the area P4, and thus, the wireless tags located in the area P4 do not receive the radio wave transmitted by the registration antenna 23. Therefore, the wireless tags located in the area P4 do not respond to the radio wave transmitted by the registration antenna 23.

Figure 3:
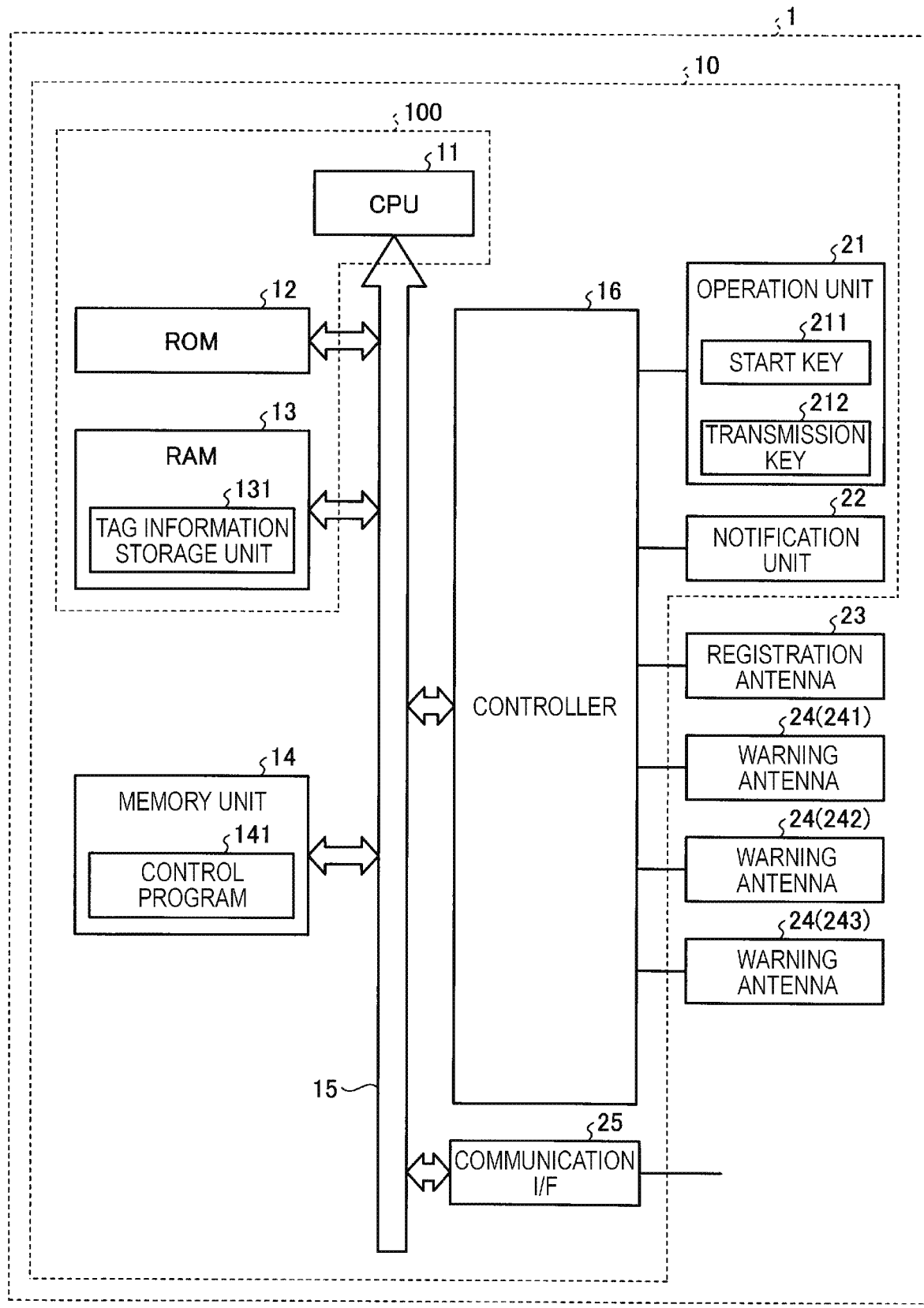
FIG. 3 is a block diagram showing a hardware configuration of the commodity container and a wireless tag reader therein.

The following describes hardware of the commodity container 1 and the wireless tag reader 10 provided in the commodity container 1. FIG. 3 is a block diagram showing a hardware configuration of the commodity container 1 and the wireless tag reader 10 therein. In FIG. 3, the commodity container 1 is surrounded by the dotted line of reference numeral 1, and the wireless tag reader 10 is surrounded by the dotted line of reference numeral 10. As shown in FIG. 3, the commodity container 1 and the wireless tag reader 10 include a central processing unit (CPU) 11, a read only memory (ROM) 12, a random access memory (RAM) 13, a memory unit 14, and the like. The CPU 11 is a control entity. The ROM 12 stores various programs. The RAM 13 loads programs and various data. The memory unit 14 stores various programs. The CPU 11, the ROM 12, the RAM 13, and the memory unit 14 are connected to each other via a bus 15. The CPU 11, the ROM 12, and the RAM 13 make up a control unit 100. That is, the control unit 100 executes control processing of the commodity container 1 and the wireless tag reader 10 described below by the CPU 11 operating according to the control program stored in the ROM 12 or the memory unit 14 and loaded in the RAM 13.

The RAM 13 includes the tag information storage unit 131. The tag information storage unit 131 stores tag information received by the registration antenna 23.

The memory unit 14 is configured with a hard disc drive (HDD), a flash memory, or the like and maintains the stored contents even when the power is shut off. The memory unit 14 includes a control program unit 141. The control program unit 141 stores a control program for controlling the commodity container 1 and the wireless tag reader 10.

The control unit 100 connects an operation unit 21 and a notification unit 22 via a bus 15 and a controller 16. In addition, the control unit 100 connects the registration antenna 23 and the warning antenna 24 via the bus 15, the controller 16, and a communication I/F (not shown). Since the communication I/F to which tag information received by the registration antenna 23 is input and the communication I/F to which tag information received by the warning antenna 24 is input are different, the control unit 100 can determine whether tag information is received by the registration antenna 23 or tag information is received by the warning antenna 24 based on which communication I/F is the communication I/F to which the tag information is input. The communication I/F to which tag information received by the warning antenna 241 is input, the communication I/F to which tag information received by the warning antenna 242 is input, and the communication I/F to which tag information received by the warning antenna 243 is input may be the same communication I/F or different communication I/F.

The operation unit 21 is a keyboard including user interface such as a start key 211 and a transmission key 212. The start key 211 is a key for transmitting radio waves from the registration antenna 23 and the warning antenna 24 to the wireless tag in order to collect tag information from the wireless tag. The transmission key 212 is a key for transmitting the tag information stored in the tag information accommodation unit 131 to the POS terminal 9.

The notification unit 22 is a device or mechanism for supplying the information (e.g., visually or acoustically) and is, for example, a display lamp, a buzzer or a speaker. The registration antenna 23 and the warning antenna 24 are described above, and thus the descriptions thereof will be omitted here.

In addition, the control unit 100 is connected to a communication interface (I/F) 25 via the bus 15. The communication interface 25 is connected to the POS terminal 9 via, for example, short distance wireless communication. The control unit 100 transmits and receives information to and from the connected POS terminal 9.

Figure 4:
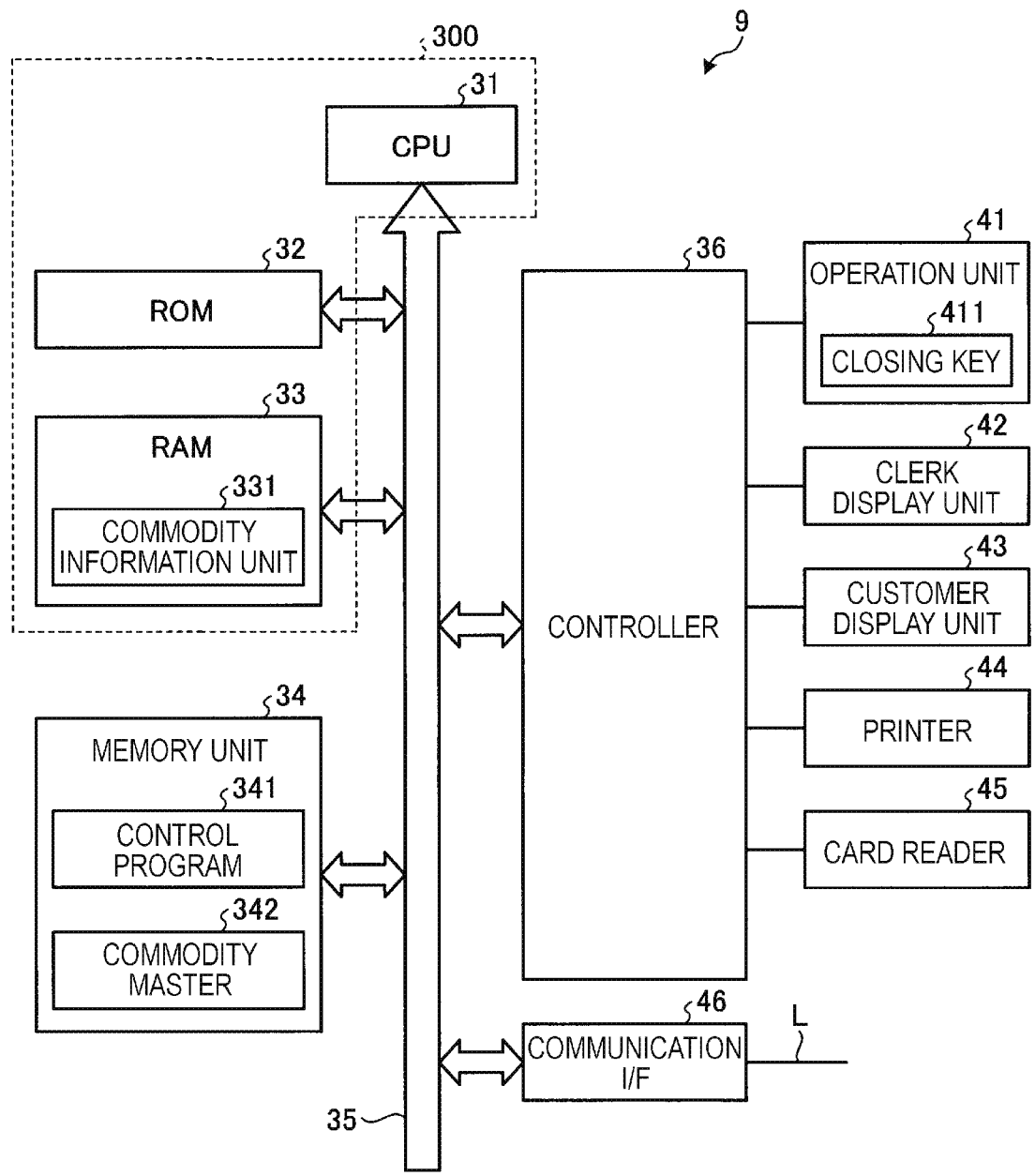
FIG. 4 is a block diagram showing a hardware configuration of a Point of Sales (POS) terminal.

Next, the hardware of the POS terminal 9 will be described. FIG. 4 is a block diagram showing a hardware configuration of the POS terminal 9. As shown in FIG. 4, the POS terminal 9 includes a CPU 31, a ROM 32, a RAM 33, a memory unit 34, and the like. The CPU 31 is a control entity. The ROM 32 stores various programs. The RAM 33 loads programs and various data. The memory unit 34 stores various programs. The CPU 31, the ROM 32, the RAM 33, and the memory unit 34 are connected to each other via a bus 35. The CPU 31, the ROM 32, and the RAM 33 make up a control unit 300. That is, the control unit 300 executes control processing of the POS terminal 9 described below by the CPU 31 operating according to the control program stored in the ROM 32 and the memory unit 34 and loaded in the RAM 33.

The RAM 33 includes a commodity information unit 331. The commodity information unit 331 stores commodity information (e.g., commodity name, commodity price, and the like) of the commodity for which the POS terminal 9 has performed sales registration processing.

The memory unit 34 is configured with an HDD, a flash memory, or the like and maintains the stored contents even when the power is shut off. The memory unit 34 includes a control program unit 341 and the commodity master 342. The control program unit 341 stores a control program for controlling the POS terminal 9. The commodity master 342 stores the commodity name of a commodity and the price of the commodity in association with a commodity code for all the commodities to be sold at the store.

The control unit 300 includes an operation unit 41, a clerk display unit 42, a customer display unit 43, a printer 44, and a card reader 45 via the bus 35 and a controller 36. The operation unit 41 is a keyboard including a closing key 411 operated to end a transaction with the customer. The clerk display unit 42 displays information such as commodity information and settlement information to the clerk. The customer display unit 43 displays information such as commodity information and settlement information to the customer. The printer 44 issues a receipt on which commodity information, settlement information, and the like are printed. The card reader 45 reads card information such as a credit card.

In addition, the control unit 300 is connected to a communication interface (I/F) 46 via the bus 35. The communication interface 46 is connected to the wireless tag reader 10 via, for example, short distance wireless communication. The control unit 300 transmits and receives information to and from the connected wireless tag reader 10.

Figure 5:
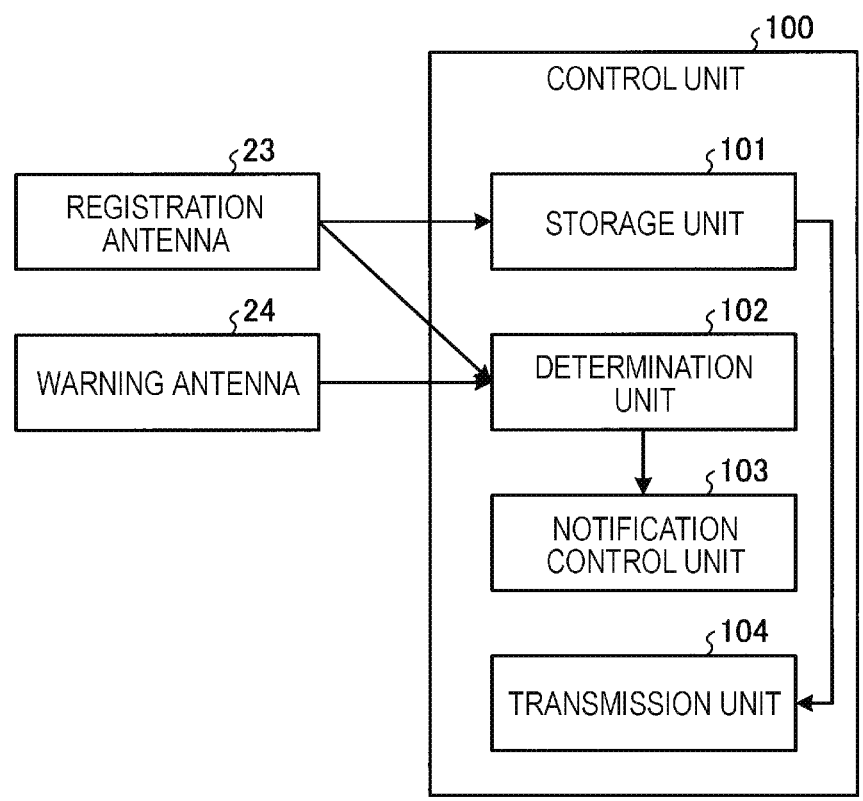
FIG. 5 is a functional block diagram showing a functional configuration of the wireless tag reader.

From here, the functional configuration of the wireless tag reader 10 will be described. FIG. 5 is a functional block diagram showing the functional configuration of a wireless tag reader. As shown in FIG. 5, the control unit 100 of the wireless tag reader 10 functions as a storage unit 101, a determination unit 102, a notification control unit 103, and a transmission unit 104 according to the control program stored in the control program unit 141 and loaded in the RAM 13.

The storage unit 101 stores the tag information including the commodity identification information received by the registration antenna 23 in the tag information storage unit 131.

The determination unit 102 determines whether tag information is received by the registration antenna 23 or tag information is received by the warning antenna 24.

When the warning antenna 24 receives tag information related to the commodity and the registration antenna 23 does not receive the tag information, the notification control unit 103 generates and transmits a control signal or the like to the notification unit 22 to notify that the registration antenna 23 does not receive the tag information related to the commodity. Upon receiving the control signal, the notification unit 22 generates a notification output by lighting in red or blinking the display lamp thereof, for example.

The transmission unit 104 transmits the tag information stored in the tag information storage unit 131 by the storage unit 101 to the POS terminal 9.

Figure 6:
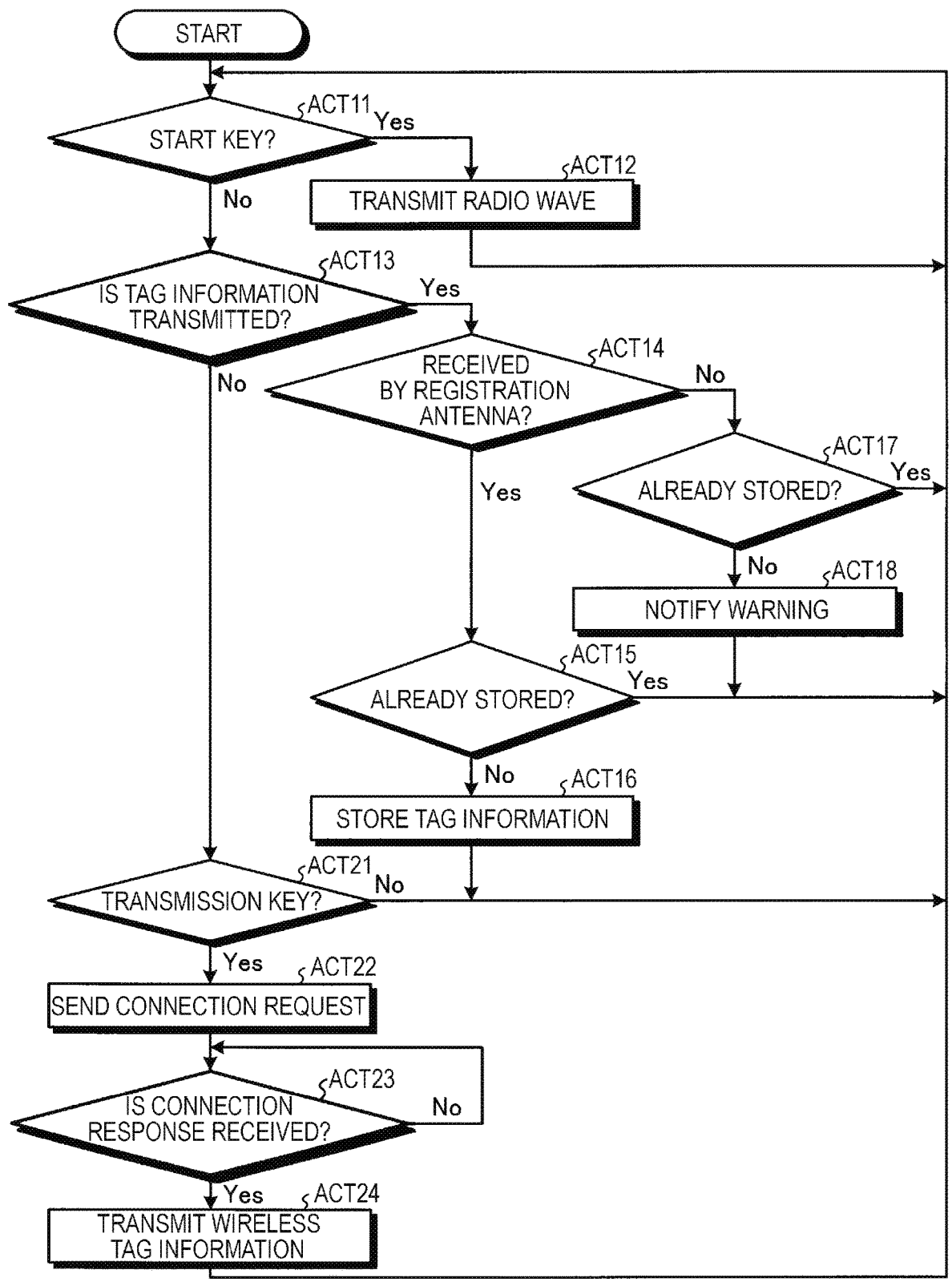
FIG. 6 is a flowchart showing a flow of control processing of the wireless tag reader.

Next, control of the wireless tag reader 10 will be described. FIG. 6 is a flowchart showing the flow of control processing of the wireless tag reader 10. As shown in FIG. 6, the control unit 100 of the wireless tag reader 10 determines whether the start key 211 is operated (ACT11). If it is determined that the start key 211 is operated (Yes in ACT11), the control unit 100 transmits radio waves for reading the information of the wireless tag from the registration antenna 23 and the warning antenna 24. (ACT12). In this state, the registration antenna 23 receives tag information from the wireless tag located in the area P1. In addition, the warning antenna 241 receives tag information from the wireless tag located in the area P2. The warning antenna 242 receives tag information from the wireless tag located in the area P3. The warning antenna 243 receives tag information from the wireless tag located in the area P4. Then, the control unit 100 returns to ACT11.

If it is determined that the start key 211 is not operated (No in ACT11), the control unit 100 determines whether the registration antenna 23 or the warning antenna 24 receives the tag information (ACT13). If it is determined that the registration antenna 23 or the warning antenna 24 receives the tag information (Yes in ACT13), the determination unit 102 determines whether the registration antenna 23 receives tag information or the warning antenna 24 receives tag information (ACT14). When the determination unit 102 determines that the registration antenna 23 receives the tag information (Yes in ACT14), the control unit 100 searches the tag information storage unit 131 based on the commodity identification information included in the received tag information to determine whether the commodity identification information included in the received tag information is already stored in the tag information storage unit 131 (ACT15). If it is determined that the tag information including the commodity identification information is not yet stored in the tag information storage unit 131 (No in ACT15), the storage unit 101 stores the tag information (ACT16). Then, the control unit 100 returns to ACT11. On the other hand, if it is determined that the commodity identification information included in the received tag information is already stored in the tag information storage unit 131 (Yes in ACT15), the control unit 100 returns to ACT11.

In addition, when the determination unit 102 determines that the registration antenna 23 does not receive tag information (that is, the warning antenna 24 receives tag information) (No in ACT14), the control unit 100 determines whether the commodity identification information included in the received tag information is already stored in the tag information storage unit 131 (ACT17). If it is determined that the tag information including the commodity identification information is not yet stored in the tag information storage unit 131 (No in ACT17), the notification control unit 103 lights the notification unit 22 to notify that the registration antenna 23 does not receive tag information related to the commodity (ACT18). Then, the control unit 100 returns to ACT11. In addition, if it is determined that the commodity identification information included in the received tag information is already stored in the tag information storage unit 131 (Yes in ACT17), the control unit 100 returns to ACT11.

In addition, if it is determined that neither the registration antenna 23 nor the warning antenna 24 receives tag information (No in ACT13), the control unit 100 determines whether the transmission key 212 is operated (ACT21). When performing settlement of the commodities to purchase, the customer moves the commodity container 1 to the POS terminal 9 installed in the settlement unit to operate the transmission key 212. If it is determined that the transmission key 212 is operated (Yes in ACT21), the control unit 100 sends a connection request to the POS terminal 9 using short distance wireless communication (ACT22). Then, the control unit 100 determines whether or not a connection response indicating that the connection is made from the POS terminal 9 is received (ACT23). When the control unit waits until the connection response is received (No in ACT23) and receives the connection response from the POS terminal 9 (Yes in ACT23), the transmission unit 104 transmits all tag information stored in the tag information storage unit 131 to the POS terminal 9 (ACT24). Then, the control unit 100 returns to ACT11. In addition, if it is determined that the transmission key 212 is not operated (No in ACT21), the control unit 100 returns to ACT11.

Figure 7:
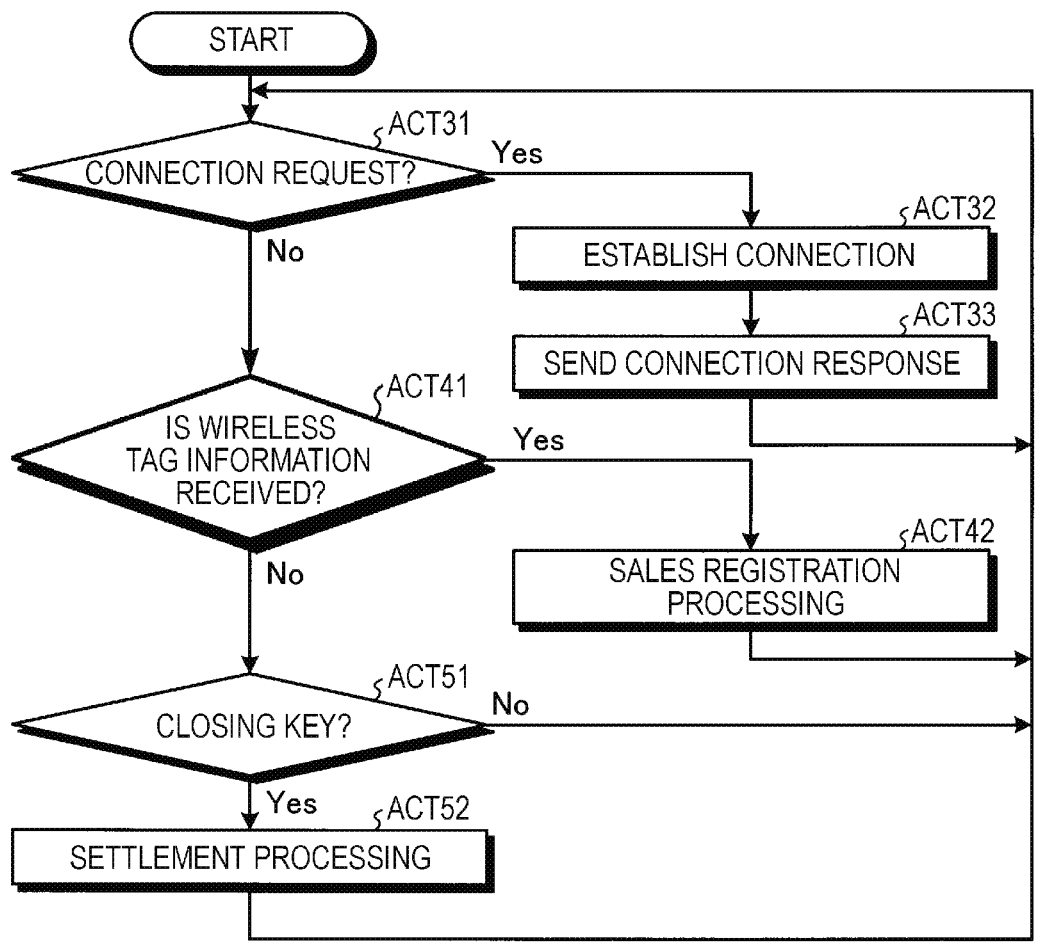
FIG. 7 is a flowchart showing a flow of control processing of the POS terminal.

Next, control of the POS terminal 9 will be described. FIG. 7 is a flowchart showing a flow of control processing of the POS terminal 9. As shown in FIG. 7, the control unit 300 of the POS terminal 9 determines whether there is a connection request from the wireless tag reader 10 (ACT31). If it is determined that there is a connection request from the wireless tag reader 10 (Yes in ACT31), the control unit 300 establishes a connection with the wireless tag reader 10 (ACT32). Then, the control unit 300 transmits a response indicating that the connection is established to the wireless tag reader 10 (ACT33). In this state, the POS terminal 9 can communicate with the wireless tag reader 10. Then, the control unit 300 returns to ACT31.

In addition, if it is determined that there is no connection request from the wireless tag reader 10 (No in ACT31), the control unit 300 determines whether the tag information transmitted by the wireless tag reader 10 that establishes the connection is received (ACT41). If it is determined that the tag information transmitted by the wireless tag reader 10 is received (Yes in ACT41), the control unit 300 executes sales registration processing related to the commodities purchased by the customer based on the commodity identification information included in the received tag information (ACT33). Specifically, the control unit 300 searches the commodity master 342 based on the commodity code included in the commodity identification information to read out the commodity information associated with the commodity code and store the commodity information in the commodity information unit 331. Then, the control unit 300 returns to ACT31.

In addition, if it is determined that the tag information is not received (No in ACT41), the control unit 300 determines whether the closing key 411 is operated (ACT51). If it is determined that the closing key 411 is operated (Yes in ACT51), the control unit 300 executes settlement processing related to the commodities purchased by the customer based on the commodity information stored in the commodity information unit 331 for sales registration processing in ACT42 (ACT52). Then, the control unit 300 returns to ACT31. If it is determined that the operation of the closing key 411 is operated (No in ACT51), the control unit 300 returns to ACT31.

According to such an embodiment, the output of the radio wave transmitted from the registration antenna 23 to the wireless tag is weak, and therefore, only tag information from the wireless tag (s) located in the area P1, where the radio wave reaches, is received. Then, when the tag information is received by the warning antenna 24 and tag information is not received by the registration antenna 23, the wireless tag reader 10 notifies that the tag information related to the commodity was not received by the registration antenna 23. Based on the notification, the customer brings the commodity closer to the registration antenna 23 to read the wireless tag. Therefore, even if the output from the registration antenna 23 is weak, the commodity container 1 including the wireless tag reader 10 can be used to reliably read the tag information of the wireless tags attached to the commodities accommodated in the container space 8.

In the above example embodiment, a display lamp is described as an example of the notification unit 22. However, the notification unit 22 is not limited thereto and may be, for example, a display unit that displays characters and images, and/or a sound output unit (speaker) that outputs sounds and messages. When the notification unit 22 is a display unit, the display unit can display a message indicating that the registration antenna 23 has not received the tag information related to the commodity. When the notification unit 22 is a sound output unit, the sound output unit can output a sound or message indicating that the registration antenna 23 has not received the tag information related to the commodity.

In addition, in the above example embodiment, a basket for accommodating commodities is described as an example of the commodity container 1. However, the commodity container 1 is not limited thereto and may be, for example, a shopping cart for accommodating commodities.

In addition, in the above example embodiment, a warning antenna 24 is provided on each of the side surface portion 3, the side surface portion 4, the side surface portion 5, and the bottom surface portion 6. However, the present disclosure is not limited thereto and the warning antenna 24 may be provided on just one of the side surface portion 3, the side surface portion 4, the side surface portion 5, and the bottom surface portion 6, or combinations thereof. In such a case, the particular surface (s) provided with the warning antenna (s) 24 is to be considered the second surface.

In addition, in the above example embodiment, the registration antenna 23 is provided on the side surface portion 2. However, the present disclosure is not limited thereto and the registration antenna 23 may instead be provided on any one of the side surface 3, the side surface 4, the side surface 5, and the bottom surface 6. However, in general, it is not preferred to provide the registration antenna 23 on the bottom surface portion 6 because, if the registration antenna 23 is provided on the bottom surface portion 6, there is a possibility that the radio wave transmitted from the registration antenna 23 cannot reach a wireless tag due to the commodities already being stacked on the flat plate 7. That is, the registration antenna 23 is preferably provided on at least one of the side surface portion 2, the side surface portion 3, the side surface portion 4, and the side surface portion 5.

The program executed by the commodity container 1 of the above example embodiment can be recorded and provided in a file in installable format or executable format in a computer-readable recording medium such as a CD-ROM, a flexible disk (FD), a CD-R, a digital versatile disk (DVD) or the like.

In addition, a program to be executed by the commodity container 1 of the embodiment may be configured to be stored on a computer connected to a network such as the Internet to be downloaded via the network. In addition, the program executed by the commodity container 1 of the embodiment may be provided or distributed via a network such as the Internet.

In addition, the program executed by the commodity container 1 of the present disclosure may be configured to be provided by being incorporated in a ROM or the like in advance.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handheld basket, comprising:
   a handheld basket main body having a container space;
   a first antenna configured to receive tag information from wireless tags within a first range covering a first region of the container space;
   a second antenna configured to receive tag information from wireless tags within a second range covering a second region of the container space, the second range being different from the first range; and
   a processing circuit configured to:
      store tag information received by the first antenna in a data storage;
      determine whether tag information received by the second antenna corresponds to the stored tag information; and generate a control signal for generation of a user notification when the tag information received by the second antenna does not correspond to the stored tag information.

2. The handheld basket according to claim 1, wherein the user notification is not generated when the tag information received by the second antenna corresponds to the stored tag information.

3. The handheld basket according to claim 1, wherein
the first antenna is on a first side surface of the handheld basket main body, and
the second antenna is on a second side surface of the handheld basket main body different from the first side surface.

4. The handheld basket according to claim 3, wherein the second side surface is adjacent to the first side surface.

5. The handheld basket according to claim 3, wherein the second side surface is opposite to the first side surface.

6. The handheld basket according to claim 1, wherein
the first antenna is on a side surface of the handheld basket main body, and
the second antenna is on a bottom surface of the handheld basket main body.

7. The handheld basket according to claim 1, further comprising:
a third antenna configured to receive tag information from wireless tags within a third range covering a third region of the container space, the third range being different from the first range and the second range, wherein
the processing circuit is further configured to:
determine whether tag information received by the third antenna corresponds to the stored tag information; and
generate a second control signal for generation of a user notification when the tag information received by the third antenna does not correspond to the stored tag information.

8. The handheld basket according to claim 1, further comprising:
a notification device configured to generate a visual or acoustic output according to the control signal.

9. The handheld basket according to claim 1, further comprising:
a user interface configured to cause the first antenna and the second antenna to generate radio waves for reading tag information when operated by a user.

10. The handheld basket according to claim 1, further comprising:
a communication interface configured to transmit the tag information stored in the data storage.

11. A commodity container, comprising:
a main body having a container space;
a first antenna on a first side surface of the main body, the first antenna being configured to receive tag information from wireless tags within a first range covering a first region of the container space;
a second antenna on a second side surface of the main body opposite to the first side surface, the second antenna being configured to receive tag information from wireless tags within a second range covering a second region of the container space, the second range being different from the first range; and
a processing circuit configured to:
store tag information received by the first antenna in a data storage;
determine whether tag information received by the second antenna corresponds to the stored tag information; and
generate a control signal for generation of a user notification when the tag information received by the second antenna does not correspond to the stored tag information.

12. The commodity container according to claim 11, wherein the user notification is not generated when the tag information received by the second antenna corresponds to the stored tag information.

13. The commodity container according to claim 11, further comprising:
a third antenna configured to receive tag information from wireless tags within a third range covering a third region of the container space, the third range being different from the first range and the second range, wherein
the processing circuit is further configured to:
determine whether tag information received by the third antenna corresponds to the stored tag information; and
generate a second control signal for generation of a user notification when the tag information received by the third antenna does not correspond to the stored tag information.

14. The commodity container according to claim 11, further comprising:
a notification device configured to generate a visual or acoustic output according to the control signal.

15. The commodity container according to claim 11, further comprising:
a user interface configured to cause the first antenna and the second antenna to generate radio waves for reading tag information when operated by a user.

16. The commodity container according to claim 11, further comprising:
a communication interface configured to transmit the tag information stored in the data storage.

17. A commodity container, comprising:
a main body having a container space;
a first antenna configured to receive tag information from wireless tags within a first range covering a first region of the container space;
a second antenna configured to receive tag information from wireless tags within a second range covering a second region of the container space, the second range being different from the first range;
a third antenna configured to receive tag information from wireless tags within a third range covering a third region of the container space, the third range being different from the first range and the second range; and
a processing circuit configured to:
store tag information received by the first antenna in a data storage;
determine whether tag information received by the second antenna corresponds to the stored tag information;
generate a first control signal for generation of a first user notification when the tag information received by the second antenna does not correspond to the stored tag information;
determine whether tag information received by the third antenna corresponds to the stored tag information; and
generate a second control signal for generation of a second user notification when the tag information received by the third antenna does not correspond to the stored tag information.

18. The commodity container according to claim 17, wherein the user notification is not generated when the tag information received by the second antenna corresponds to the stored tag information.

19. The commodity container according to claim 17, wherein
the first antenna is on a first side surface of the main body, and
the second antenna is on a second side surface of the main body different from the first side surface.

20. The commodity container according to claim 19, wherein the third antenna is on a third side surface of the main body different from the first side surface and the second side surface.

* * * * *